（12) United States Patent
Jacquet et al.

(10) Patent No.: US 6,958,956 B1
(45) Date of Patent: Oct. 25, 2005

(54) MAGNETO-OPTICAL READING DEVICE FOR MULTI-TRACK MAGNETIC TAPES

(75) Inventors: Jean-Claude Jacquet, Orsay (FR); Stephane Bertrand, Forges les Bains (FR); Françoise Le Texier, Ivry S/Seine (FR)

(73) Assignee: Thales, Paris (FR)

( * ) Notice: Subject to any disclaimer, the term of this patent is extended or adjusted under 35 U.S.C. 154(b) by 451 days.

(21) Appl. No.: 10/048,476

(22) PCT Filed: Aug. 4, 2000

(86) PCT No.: PCT/FR00/02248

§ 371 (c)(1),
(2), (4) Date: Jun. 17, 2002

(87) PCT Pub. No.: WO01/11619

PCT Pub. Date: Feb. 15, 2001

(30) Foreign Application Priority Data

Aug. 10, 1999 (FR) .................................. 99 10367
Apr. 7, 2000 (FR) .................................. 00 04502

(51) Int. Cl.[7] ............................................ G11B 11/00
(52) U.S. Cl. ............................... 369/13.37; 369/13.32; 360/114.01
(58) Field of Search .................... 369/13.37, 13.32, 369/13.13, 13.33, 97, 112.01, 14, 15; 360/114.01, 360/114.04, 114.09, 114.02; 720/746

(56) References Cited

U.S. PATENT DOCUMENTS

| 4,694,316 A | | 9/1987 | Chabbal | |
| 4,901,297 A | * | 2/1990 | Komatsu et al. | 369/13.37 |
| 4,942,490 A | | 7/1990 | Lehureau | |
| 5,120,136 A | * | 6/1992 | Oakley | 369/97 |
| 5,124,869 A | | 6/1992 | Lehureau | |
| 5,140,566 A | * | 8/1992 | Kang et al. | 369/13.37 |
| 5,157,650 A | * | 10/1992 | Ozue et al. | 369/111 |
| 5,191,221 A | * | 3/1993 | van Rosmalen et al. | 250/559.3 |
| 5,218,595 A | | 6/1993 | Lehureau et al. | |
| 5,321,683 A | * | 6/1994 | Olczak | 369/112.24 |
| 5,392,181 A | * | 2/1995 | Lhureau et al. | 360/114.09 |
| 5,404,260 A | | 4/1995 | Machui et al. | |
| 5,548,114 A | * | 8/1996 | Van Rosmalen et al. | 250/236 |
| 5,568,336 A | * | 10/1996 | Jolivet | 360/114.07 |
| 5,581,534 A | * | 12/1996 | Van Rosmalen et al. | 369/112.01 |
| 5,633,851 A | * | 5/1997 | Kahlman et al. | 369/13.37 |
| 5,661,704 A | * | 8/1997 | Van Rosmalen | 369/44.14 |
| 5,689,391 A | * | 11/1997 | Maurice | 360/114.08 |
| 5,703,845 A | * | 12/1997 | Audoin et al. | 369/44.41 |
| 5,802,033 A | * | 9/1998 | Van Rosmalen | 369/97 |
| 5,870,361 A | * | 2/1999 | Audoin | 369/44.41 |

(Continued)

FOREIGN PATENT DOCUMENTS

EP 0 436 424 7/1991

(Continued)

*Primary Examiner*—Tan Dinh
(74) *Attorney, Agent, or Firm*—Oblon, Spivak, McClelland, Maier & Neustadt, P.C.

(57) ABSTRACT

The disclosure relates to a magneto-optical reading device for multi-track magnetic tapes, including a flat large incident beam directed onto the active part of a magneto-optical read head and reflected by this head onto an array of sensors, characterized in that it includes a correction device able to move the zone of incidence of the beam on the read head in order to keep the beam optimally positioned on the active part of the read head as the latter suffers progressive wear. The invention increases the useful working life of such a reading device.

7 Claims, 1 Drawing Sheet

U.S. PATENT DOCUMENTS

| | | |
|---|---|---|
| 5,933,940 A | 8/1999 | Maillot et al. |
| 5,961,848 A | 10/1999 | Jacquet et al. |
| 5,963,525 A * | 10/1999 | Audoin et al. ............ 369/59.22 |
| 6,151,192 A * | 11/2000 | Maurice ................... 369/13.32 |
| 6,535,351 B1 * | 3/2003 | Yip et al. ............... 360/114.01 |
| 6,765,755 B1 * | 7/2004 | Jacquet ................... 360/114.05 |
| 6,771,567 B2 * | 8/2004 | Nozieres et al. ......... 369/13.05 |

FOREIGN PATENT DOCUMENTS

| | | |
|---|---|---|
| EP | 0 611 202 | 8/1994 |
| EP | 0611202 | 8/1994 |
| EP | 0 718 826 | 6/1996 |
| FR | 2 699 723 | 6/1994 |

\* cited by examiner

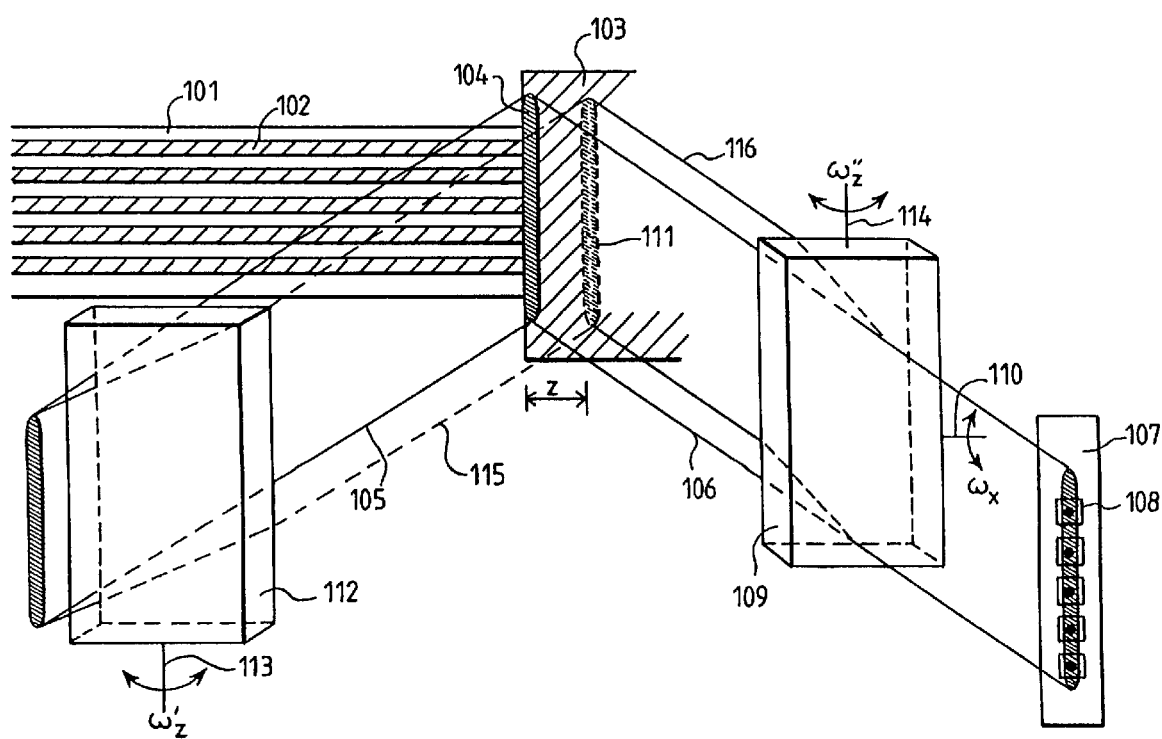

MAGNETO-OPTICAL READING DEVICE FOR MULTI-TRACK MAGNETIC TAPES

BACKGROUND OF THE INVENTION

1. Field of the Invention

The present invention relates to devices able to read magneto-optically and simultaneously all the parallel tracks recorded on a magnetic tape. It is notably applicable to magnetic tape systems for recording high-density digital data, known under the name SDCR (Static Digital Cassette Recording).

2. Description of the Related Art

The SDCR high-density magnetic tape reading/recording system was designed in the central R&D laboratory of the THOMSON-CSF company with the goal of producing a high-density magnetic tape recording system operating simultaneously on a set of parallel tracks, without using classic rotating heads. For this purpose the SDCR uses a highly original recording device incorporating a magnetic head having a set of integrated poles laid out matrix-fashion, and a Kerr effect magneto-optical read head of substantially monolithic structure. The write and read heads therefore enable parallel recording and reading of extremely high data density, despite the fact that the fabrication of the SDCR is very simple compared with rival systems.

More particularly, the Kerr effect read head includes, in a manner now known to professionals of the art, a prism comprising a stack of suitable materials. It is illuminated by a laser producing a flat polarized incident beam whose thickness is adapted to the dimension of the bits written on the magnetic tracks, and whose width is sufficient to cover the whole breadth of the magnetic tape. After reflection on the sensitive layer of the head, the polarization of the optical beam changes according to the direction of the magnetization induced by each recorded track of the magnetic tape. This polarization change is transformed into an intensity change, by a polarizer for example. The beam is then received on an array of sensors, of CCD (charge-coupled device) type for example. Each of the cells of this CCD then delivers a signal representative of the information recorded on each of the tape tracks.

The system described succinctly above has been divulged in more detail in a set of patents describing the global architecture of the system and certain special aspects of its fabrication. We can notably mention the following French patents filed by the applicant:

8917313 (28 Dec. 1989), publication no. 2 656 723,
84 07761 (18 May 1984), publication no. 2 564 674,
93 01407 (7 Feb. 1993), publication no. 2 701 332,
90 00546 (18 Jan. 1990), publication no. 2 657 100,
92 11146 (18 Sep. 1992), publication no. 2 696 037,
8614974 (28 Oct. 1986), publication no. 2 605 783,
87 14818 (4 May 1987), publication no. 2 622 335,
88 05592 (27 Apr. 1988), publication no. 2 630 853,
96 08393 (5 Jul. 1996), publication no. 2 750 787.

This system has enabled satisfactory prototypes to be built. Experiments on these prototypes have however revealed a number of problems whose resolution would enhance both the performance and working life of devices made according to this system.

One of these problems concerns the wear of the magnetic read head.

Although this read head is made from particularly abrasion-resistant materials, it is still subject to wear caused by the movement of the magnetic tape over it, which leads to progressive degradation of the head's performance and ultimately to its failure. This is moreover common to all systems in which there is contact between the read head and the magnetic tape, in particular the systems with rotating heads used today.

SUMMARY OF THE INVENTION

To overcome this disadvantage, or at least to significantly slow down this phenomenon, the invention proposes a magneto-optical reading device for multi-track magnetic tapes, including a flat large incident beam directed onto the active part of a magneto-optical read head and reflected by this head onto an array of sensors, characterized in that it includes correction means able to move the zone of incidence of said beam on said read head in order to keep said beam optimally positioned on said active part of said read head as the latter suffers progressive wear.

According to a characteristic of the invention, said correction means include a first flat parallel-faced plate positioned on the path of said incident beam and rotatable around a first axis parallel to the plane of said incident beam and perpendicular to its axis.

According to another characteristic, said correction means also include a second flat parallel-faced plate positioned on the path of the reflected beam returned by said read head and rotatable around a second axis parallel to the plane of said reflected beam and perpendicular to its axis, this second plate being provided to correct the displacement of the reflected beam associated with the displacement of said incident beam caused by the rotation of said first plate.

According to another characteristic of the invention, said second plate also includes a third rotation axis perpendicular to the plane of said reflected beam so as to be able to move this reflected beam in its own plane in order to keep the spot beams of this beam modulated by said magnetic tape tracks on the corresponding sensors of said detection array, and thereby compensate for any wandering movements of the magnetic tape.

According to another characteristic of the invention, the device includes a controlled system that drives said correction means to assure permanent and optimal compensation for wear of said read head.

Other characteristics and advantages of the invention will become clear on reading the following description of a preferred embodiment, taken only as non-limitative example, with reference to the attached drawing which shows schematically a read head according to the invention in operation with a magnetic tape.

BRIEF DESCRIPTION OF THE DRAWING

FIG. 1 is an exemplary embodiment of a magneto-optical reading device of the present invention.

DETAILED DESCRIPTION OF THE INVENTION

In the FIGURE, a magnetic tape 101 carrying a set of parallel tracks 102 moves over a read head 103. The structure of this head is known and is therefore shown only schematically and transparently to show the area of contact of the head with the magnetic tape.

The active part 104, magnetized by the tape, is a very narrow straight strip (about 2 to 3 microns wide). In the FIGURE it is shown at the extreme left-hand edge of the read head 103.

This active part is illuminated by a laser (not shown in the FIGURE) whose polarized light beam is shaped by a known optical system (not shown) such that its dimensions match those of the active part 104.

This beam 105, oriented to illuminate the active part 104, is reflected from this active part 104 with its polarization modulated according to the orientation of the bits in the magnetic tracks 102, to form a return beam 106 comprising a series of modulated spot beams which are directed onto an array 107 of sensors, of CCD type for example. Each sensor 108 in this array receives one of the spot beams of the beam 106 which has been modulated by one of the tracks 102. The intensity received by each of these cells depends on the modification of the beam's polarization caused by the magnetic state of the track being read. Polarizing plates (not shown, but known to professionals of the art) are used to transform this polarization change into an intensity change that can be detected by the cells 108.

The interest of this system is that the reading of the tracks is not individualized at the actual head 103, unlike magneto-resistive heads which necessitate a longitudinal segmentation adapted to the tracks and a tracking system to follow the tracks on the magnetic tape and compensate the lateral wandering of the tape, both of which are very difficult to implement.

Individualization of the tracks is therefore transferred to the array of sensors 107, which is a well-known and commercially-available device.

Compensation for tape wandering is achieved using a flat parallel-faced plate 109 that can rotate about an axis 110 perpendicular to the plane of the beam 106. The movement $\omega_x$ thus obtained enables this beam 106 to be moved in its own plane while remaining parallel to itself, according to the well-known optical properties of flat parallel-faced plates. A servo system, of known type, is used to keep the image of the tracks 102 on the cells 108 to which they are assigned, such that each of these cells always delivers the signal recorded on the corresponding track with the maximal level possible—and despite movements of the magnetic tape in its own plane.

To operate correctly the system requires contact of the magnetic tape 101 with the head 103. This inevitably leads to wear of the head 103 over time, especially in very high bit-rate systems in which the tape may be spooled at very high speed. Although this wear is very slight in absolute terms, owing to the very small dimensions of the active part 104, its relative value is not negligible. Consequently means of compensating for this wear is essential if the device is to have a reasonable working lifetime.

In the example shown in the FIGURE, the active part 104 will be displaced by a distance Z after a few hundred hours of operation, to a position 111 which is situated off the plane of the incident beam 105.

To be able to move this incident beam onto the zone 111, the invention provides for a second flat parallel-faced plate 112 that can rotate about an axis 113 parallel to the plane of the incident beam 105 and perpendicular to the beam's axis. In this manner, and according to the well-known optical action of flat parallel-faced plates, the movement $\omega_{z'}$ of this flat parallel-faced plate moves the incident beam 105 in a direction perpendicular to its plane beam while maintaining it parallel to itself. This beam can therefore be moved to the new position 111 of the active part of the read head.

The return beam 116 reflected by this zone at its new position 111 is of course shifted relative to the initial reflected beam 106 and therefore no longer lands in the right position on the sensor array 107.

To compensate this shift of the return beam, the invention also proposes to turn the flat parallel-faced plate 109 about an axis 114 parallel to the plane of the return beam 106 and perpendicular to its axis. The movement $\omega_{z''}$ of the plate 109 around this axis 114 will be substantially symmetrical to the movement $\omega_{z'}$ of the plate 112 around the axis 113 and will compensate the displacement of the return beam associated with the displacement of the incident beam, such that this reflected beam always lands at the right position on the sensor array 107.

These displacements of the incident and reflected beams, which need to be made only extremely slowly, can be obtained by micromotors, piezoelectric for example (not shown in the FIGURE) and controlled by a controlled system (not shown) which will react in response to a detected error signal. For this purpose we could use, for example, a dedicated track of the magnetic tape that acts as a synchronization track. We could also, for example, monitor the average output signal power of the sensor cells 108 in order to achieve optimal and continuous compensation for the wear of the read head.

For reasons of visibility, in the FIGURE the flat parallel-faced plates 109 and 112 are shown only in their rest positions when the magnetic tape is centered and the read head has not yet suffered any wear. In this situation, the beams 105 and 106 are those effectively transmitted by the flat parallel-faced plates, whereas the beams 115 and 116 are those that would be transmitted when these plates have turned on the axes 113 and 114 through the angles necessary to obtain the required deviations. The paths of these beams in the plates, as illustrated in the FIGURE, are therefore not the real ones; they are shown schematically to enable the invention to be understood.

The invention can be extended to all means enabling an automatic compensation for wear of the head, such as for example a micromotor that moves the head itself—or just its sensitive part—so as to keep the reading beam on the active part of the head.

What is claimed is:

1. A magneto-optical reading device for multi-track magnetic tapes, comprising:
   a magnet-optical read head configured to receive a flat large incident beam at an active part on an initial surface of the magneto-optical read head configured to contact the multi-track magnetic tape prior to any wear on the initial surface due to passage of the multi-track magnetic tape and to reflect the flat large incident beam from the active part onto an array of sensors as a reflected beam; and
   a correction device configured to move a zone of incidence of said flat large incident beam from the active part on the initial surface to a new active part on a worn surface on said read head in order to keep said beam optimally positioned on said active part of said read head after wear of the initial surface due to the passage of the multi-track magnetic tape.

2. The magneto-optical reading device according to claim 1, wherein said correction device comprises a first flat parallel-faced plate positioned on a path of said flat large incident beam, said first flat parallel-faced plate being configured to be rotatable around a first axis parallel to a plane of said flat large incident beam and perpendicular to an axis of the flat large incident beam.

3. The magneto-optical reading device according to claim 2, wherein the correction device further comprises a second flat parallel-faced plate positioned on the path of the reflected beam returned by said read head, said second flat parallel-faced plate being configured to be rotatable around a second axis parallel to a plane of said reflected beam and perpendicular to an axis of the reflected beam, this second plate being provided to correct a displacement of the reflected beam associated with a displacement of said incident beam caused by a rotation of said first plate.

4. The magneto-optical reading device according to claim 3, wherein said second plate further configured to have a third rotation axis perpendicular to the plane of said reflected beam so as to be able to move the reflected beam in a plane including the reflected beam in order to keep spot beams of the reflected beam modulated by magnetic tape tracks of the multi-track magnetic tape on corresponding sensors of said array of sensor, and thereby compensate for any wandering movements of the multi-track magnetic tapes.

5. The magneto-optical reading device according to claim 1, further comprising a control system configured to drive said correction device to assure permanent and optimal movement of the zone of incidence to correct for wear on the initial surface.

6. A magneto-optical reading device for multi-track magnetic tapes, comprising:
   a magnet-optical read head means for receiving a flat large incident beam at an active part on an initial surface of the magneto-optical read head means configured to contact the multi-track magnetic tape prior to any wear on the initial surface due to passage of the multi-track magnetic tape and to reflect the flat large incident beam from the active part onto an array of sensors as a reflected beam; and
   a correction means for moving a zone of incidence of said flat large incident beam from the active part on the initial surface to a new active part on a worn surface on said read head means in order to keep said beam optimally positioned on said active part of said read head means after wear of the initial surface due to the passage of the multi-track magnetic tape.

7. The magneto-optical reading device according to claim 6, further comprising a control means for driving said correction means to assure permanent and optimal-movement of the zone of incidence to correct or wear on the initial surface.

* * * * *